United States Patent Office 2,910,909
Patented Nov. 3, 1959

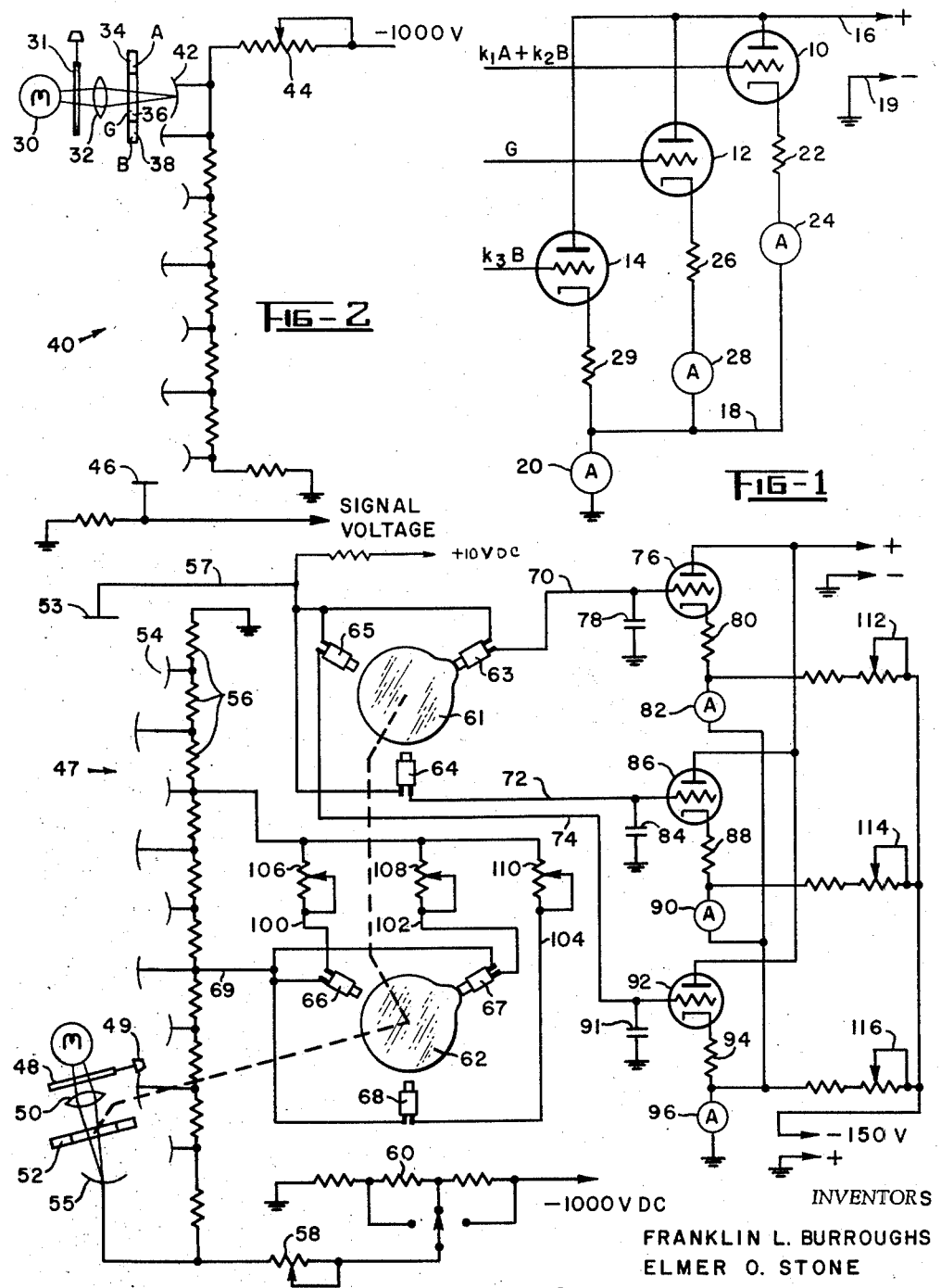

2,910,909

COLORIMETER

Elmer O. Stone and Franklin L. Burroughs, Seneca Falls, N.Y., assignors, by mesne assignments, to Sylvania Electric Products Inc., Wilmington, Del., a corporation of Delaware Application January 28, 1957, Serial No. 636,792

9 Claims. (Cl. 88—14)

This invention relates to photoelectric colorimeters and in particular to an instrument useful for the direct presentation of data specifying the visual color characteristics of light falling on it from self-luminous bodies or from reflecting or transmitting media. The instrument has many specific uses and is particularly useful in the determination of the composition of light emanating from either monochrome or color television picture tubes.

In the particular embodiment of the invention herein described, the final data are presented in terms of the system of color specification agreed upon by the International Commission on Illumination (hereinafter referred to by its French initials C.I.E.) in 1931. This does not preclude the adaptation of the instrument for presentation of data in other color systems now existent or which may be developed in the future.

At this point, a brief description of certain phases of the prior art will facilitate a better understanding of this invention. The C.I.E. system of color specification is based on fundamental properties of the eye. By experiment, it had been determined that basic color matching by the eye can be accomplished utilizing certain three color sensitivity versus wave-length curves. These curves, however, include negative lobes which make them impractical for mathematical and experimental manipulation. One of the accomplishments of the C.I.E. was to average curves obtained by a number of independent observers and then by mathematical linear transformation convert the data to the system bearing the Commission's name. This transformed data yields three curves which are always positive throughout the visible spectrum. These three curves are designated by the C.I.E. as the tristimulus values for the spectrum colors. They are denoted in the mathematics of colorimetry by the symbols $\bar{x}$, $\bar{y}$, and $\bar{z}$. A typical problem in colorimetry would require the finding of numbers to represent the visual appearance of the light from a given source. Given the energy curve of the source this can be accomplished by integrating the product of the energy of that source by $\bar{x}$, $\bar{y}$, and $\bar{z}$ with respect to wavelength. These integrations (usually numerical since $\bar{x}$, $\bar{y}$, and $\bar{z}$ are non-analytical) yield three numbers designated in the C.I.E. system as X, Y, and Z and referred to as the tristimulus specification for the color. To make possible a simpler presentation, it is customary to divide each of the tristimulus values by the sum of the three values. These quotients are called the trichromatic coordinates $x$, $y$, and $z$ and obviously have the property that $x+y+z=1$. This means that if two of the coordinates $x$, $y$, $z$ be known, the third could readily be determined. Hence a two dimensional plot of the gamut of real colors is possible. Usually the coordinates $x$ and $y$ are plotted and it is these values that the instrument of the invention described here reads directly.

The art of photoelectric colorimetry is based on the assumption that combinations of optical filters can be found which when used in conjunction with one or more suitable photocells will yield an instrument with sensitivity versus wavelength characteristics equivalent to those of the $\bar{x}$, $\bar{y}$, $\bar{z}$ curves. In practice, many sets of filters have been proposed and tried. Usually three filters, an amber-blue, a green and a red filter, will give an approximation to the shape of the C.I.E. tristimulus curves which is accurate enough for most purposes although the absolute sensitivities will be in error. Although the invention as here described makes use of three filters one of which is a combined filter, this does not prevent its use with systems based on a different number of filters, provided the appropriate mechanical and electrical changes be made.

A previously known and common method of using the filter-photocell combinations is to place the light source to be measured in front of the colorimeter and to read the photoelectric output corresponding to each of the filters on a galvanometer. For a three filter colorimeter this would yield three readings which may be designated A, G, and B, corresponding, respectively, to the amber-blue, green, and blue colors of the filters. These readings must then be converted to trichromatic coordinates by means of the following equations:

$$x = \frac{k_1 A + k_2 B}{k_1 A + k_2 B + G + k_3 B} \quad (1)$$

$$y = \frac{G}{k_1 A + k_2 B + G + k_3 B} \quad (2)$$

Here, $k_1$, $k_2$ and $k_3$ are calibration constants necessary to correct for the lack of correspondence between the absolute sensitivities of the filter-photocell combinations and the $\bar{x}$, $\bar{y}$, and $\bar{z}$ curves.

With this type of instrument, it is necessary to record three readings and then solve Equations 1 and 2 in order to arrive at the trichromatic coordinates, $x$ and $y$. Even if nomographic aids be used to speed the conversion from A, G, and B to $x$ and $y$ these aids must be reconstructed each time the instrument is recalibrated. In the invention described here, the calibration is changed simply by changing the settings of three potentiometer type controls. The $x$ and $y$ values are read directly from meter presentation of the outputs from computing circuits within the instrument. In addition, due to the optical density of the correction filters, it is difficult to use the galvanometer type instrument to measure low brightness sources or small sources of light. However, because of the optical condensing system and the amplification circuits incorporated in the invention described, measurements of these types become possible of achievement and with ease.

For a full understanding of the invention, attention is directed to the following specification taken in conjunction with the accompanying drawings in which:

Figure 1 is a circuit diagram of a tri-voltage adding system.

Figure 2 is a circuit diagram of a system for obtaining certain desired voltages, and Figure 3 is a schematic of the novel colorimeter.

It should be noted that in Equations 1 and 2, above, the denominators are identical. It should further be noted that the denominator is made up of the sums of the numerator in the equation for $x$ plus the numerator for the equation for $y$ plus an added factor $k_3 B$, this being a constant times the blue filter reading. If the denominator, which is the sum of the above three values, be made equal to unity, then the values for $x$ and $y$ become $x = k_1 A + k_2 B$ and $y = G$. The $x$ value is the output from a filter made up partly of an amber glass section and partly of a blue glass section where the light interception of the amber and blue sections is adjusted mechanically to give the photocell the same relative spectral sensitivity as the $\bar{x}$ curve. Another embodiment of the same invention makes use solely of appropriate electrical matrixing to obtain the calibration for the $\bar{x}$ curve. In any case $y$ is the output from the green filter and its photocell.

In order to add together voltages corresponding to the three components of the denominator, a basic circuit such as is shown in Figure 1 may be employed. As shown in said figure, three triodes 10, 12 and 14 are provided, all in parallel with each other, across a pair of lines 16 and 18, the line 16 being fed with positive voltage from a supply and the line 18 being grounded through an ammeter 20. The negative end 19 of the supply is also grounded. In series with the triode 10 is a current limiting resistor 22 and ammeter 24 and applied to the grid of this tube is the voltage reading A and B, taken through the special $\bar{x}$ filter modified by calibration voltages $k_1$ and $k_2$. In series with the triode 12 are the current limiting resistor 26 and ammeter 28 and applied to the grid of this tube is the voltage G resulting from the energization of the photocell behind the green filter. In series with the triode 14 is the current limiting resistor 29 with no independent meter for the current flow through this last triode. Applied to the grid of triode 14 is the voltage B from the photocell behind the blue filter, modified by a constant $k_3$. Obviously since the meter 20 is in series relation to the paralleled triodes 10, 12 and 14, it will read the sum of the currents flowing through the three triodes. It is also obvious that any or all of the grid voltages may be modified between tube cut-off and tube saturation, by proportionate change of all of the three grid voltages, effected by potentiometer adjustment or by throttling down on iris diaphragm 31 or the like, or by adjusting both, to vary the current flow through the three triodes in order to make the meter 20 read unity. When that is the case, the denominator in Equations 1 and 2 becomes unity and the values $x$ and $y$ can be read directly on suitably scaled meters 2 an4d 28 respectively, thereby eliminating the necessity of tedious solving of equations for these $x$ and $y$ values.

An arrangement for producing the voltages $k_1A+k_2B$, G, and $k_3B$ is illustrated in Figure 2. In this figure there is illustrated a standard light source 30 such as is normally used for the purpose of calibrating colorimeters, and for which $x$ and $y$ values have previously been established, an iris 31, a condensing lens 32, the special $\bar{x}$ filter 34, the tristimulus green and blue filters 36 and 38 and a photo-multiplier tube 40. A high negative voltage is applied to the cathode 42 as is common in photocell applications, which voltage may be regulated by potentiometer 44. Signal voltages may be obtained from the anode 46 of the photo-multiplier tube. One method of calibrating the instrument is to have the iris partially open and with the special filter 34 before the lens, potentiometer 44 is adjusted to give a voltage on the grid of triode 10 such that the meter 24 will give the desired reading of $k_1A+k_2B$ which is the correct $x$ reading previously established for the standard lamp 30. In the actual colorimeter of the invention, as will be explained, this adjustment will be maintained set during subsequent measuring operations of the colorimeter. Similarly with the green filter in front of the photocell and a different gain setting of the potentiometer, in this basic illustration potentiometer 44, the proper voltage for G can be produced and this voltage applied to triode 12 so as to give a reading $y$ on the meter 28. As explained above, in the colorimeter of the invention as opposed to the illustration of the principle involved, this setting of the potentiometer will be held constant. The same procedure is applied with respect to the filter 38, the current in the triode 14 being made to equal $k_3B$ and which with the standard lamp should make meter 20 read unity.

The device of Figure 2 should be coupled to the reading device of Figure 1, and desirably directly coupled in order to avoid polarity reversing stages or stages of amplification that may incorporate unnecessary instability to the system.

The principles of Figures 1 and 2 are incorporated with the schematic of the colorimeter of the invention, as illustrated in Figure 3.

In said figure is illustrated a photo-multiplier tube 47 in front of which is an iris 48 with its control knob 49, a condenser 50 and a wheel 52 containing the three filters described above. The phototube anode 53 is approximately at 10 volts D.C. positive, with respect to chassis ground. The successive dynodes 54 are supplied through the conventional dropping resistors 56 and are at more and more negative potentials. The potential at the other or cathode end 55 of the tube is highly negative, it being connected to a source of supply in the neighborhood of 1000 volts negative via a master gain control potentiometer 58 and a voltage dropping potentiometer 60, the potentiometer 60 being connected at one end to ground and at the other end to the negative end of the supply for the phototube. The shaft which drives the filter wheel 52 also drives cams or equivalent structure 61 and 62 to effect the closing of normally open contact switches, 63 through 68, as will be described. In lieu of these cams the shaft may have brushes thereon wiping over commutator segments connected to electric lines to be described. The intent is that whatever arrangement be employed, the rotation of the shaft will effect sequential connection of the photo output to electric lines identified with the particular filter which is at that moment in front of the photo-multiplier tube. Associated with the cam 61 and the three switches 63, 64 and 65 are three of the electric lines, namely lines 70, 72 and 74. Feeding one terminal of each of the three switches is a connection from line 57 leading to the photomultiplier tube. Voltage on line 70 via switch 63 controls the grid of triode 76, and, connected between said triode and the cathode supply to triode 76, is a capacitor 78. In the cathode of tube 76 is a current limiting resistor 80 and ammeter 82 to measure the amount of light passing through the combined filter. A similar arrangement is associated with line 72 and switch 64, that line having a capacitor 84, triode 86, resistor 88 and ammeter 90. Line 74, connected to switch 65, has the capacitor 91 and associated with it the triode 92 and resistor 94. The negative ends of the meters 82 and 90 and of resistor 94 are all connected together and connected to the negative or ground end of the supply for the triodes via the master meter 96, said meter giving an indication of the sum of the currents through all three of the triodes. The capacitors will hold the voltage on any one grid, after its switch opens, until the next closure of the switch whereupon the voltage across the capacitor may assume the value then on the lead 57 from the photo-multiplier tube.

While a switch is in closed position to charge or discharge a particular capacitor, the cam 62 is in a corresponding position and effects closure of a circuit to a particular line 100, 102 or 104, in each of which is a calibrating potentiometer, these being identified as 106, 108 and 110. Whereas the line 57 is connected to the anode 53 which is close to zero potential, the common line 69 to the switches 66, 67 and 68 is connected to the photo-multiplier tube at a highly negative point with the common connection to all of the potentiometers connected to the photo-multiplier at a less negative point. In effect, the individually adjustable potentiometers successively vary the sensitivity of the photo-multiplier tube by in effect changing the values of the dropping resistors across a number of the dynodes. The potentiometers 106, 108 and 110 are the means whereby initial calibration of the instrument for each of the special $\bar{x}$ filter, the green filter and the blue filter and with a standard tube may be effected. With proper settings of the potentiometers 106, 108 and 110 so as to take into account the filter-photocell combination and constants $k_1$, $k_2$ and $k_3$ as explained heretofore, the iris 48 or the master gain potentiometer 58 and associated potentiometer 60 or both may be adjusted to give a reading of unity on the master meter 96. A fixed ratio exists for the expression $k_2/k_1$ which is determined by the percentage of the total light which passes through each filter. Additional resistors 112, 114 and 116 are provided to balance out the current through meters 82, 90 and 96 before calibrating the instrument and with the iris 50 closed and no light falling on phototube 47. This is to cancel the quiescent current of each triode.

The above explains the settings employed when it is desired to calibrate the instruments. For this purpose a standard light source had been utilized. When it is desired to measure the chromaticity of a sample i.e. a source of light radiation, the light source is replaced by the sample, and the cams or equivalents are set into operation. The master gain potentiometer or the iris 48 or both are then adjusted to again obtain a reading of unity on the master meter 96, and the $x$ and $y$ coordinates of the sample read directly on meters 82 and 90.

It is desired to point out that the iris 48 was found to be particularly useful to reduce the error in color readings caused by photo-multiplier noise or rather a change in the noise level of the photo-multiplier tube, as the voltage applied to it is changed.

Initially, when the instrument is calibrated, a large part of the noise current contributed by the photo-multiplier tube was balanced out. When a sample color is read with the instrument, it is desirable not to change the photo-multiplier voltage, but rather to change the amount of light falling on the phototube cathode by the iris in order to get a unity reading on meter 96.

In operation, the rotating filter wheel is set in operation and the cam 61 also rotates with the filter wheel shaft. The purpose of cam 61 is to connect the signal from the photo-multiplier tube to the grid of tube 76 during the time that the combined special filter 34 is intercepting the beam of light passing to the cathode of the photo-multiplier tube. Cam 62 is used for the purpose of altering the value of resistance connected across several of the dynode stages during the time that filter 34 is intercepting the light beam passing to the cathode of the photo-multiplier tube, by paralleling in with some of the resistors 56 the potentiometer 106, thereby changing the gain of the photo-multiplier tube. This gain setting increases and decreases the constants $k_1$ and $k_2$ by the same amount, whereas the relation of $k_1$ to $k_2$ may be adjusted, as stated previously, by changing the individual amber filter section and blue filter section, with respect to each other and thereby passing more of the light beam through one filter section than the other. As filter 52 rotates in front of and intercepts the light beam, cam 61 rotates to a position which connects the signal at the anode of the photo-multiplier tube 47 to the grid of triode 86 while cam 62 readjusts the gain of the photo-multiplier through insertion of potentiometer 108 in parallel with some of the dynode voltage dropping resistors 56. When the rotating filter wheel puts filter 33 in a position which intercepts the beam of light, then cam 61 is in a position which connects the anode of the photo-multiplier to the grid of triode 92, and cam 62 is in a position to insert potentiometer 110 into the photo-multiplier circuit to readjust the gain of the photo-multiplier tube to a value required by calibration constant $k_3$. A motor (not shown) to rotate the filter wheel and cams 61 and 62 is of course provided.

Having thus described the invention, what is claimed as new is:

1. A colorimeter comprising a movable body carrying a number of color filters; a photomultiplier provided with dynodes connected by resistances and in a position to receive in sequence, light transmitted through the filters; a device comprising a multiplicity of energy translating elements; means operative in synchronism with the movement of the movable body for sequentially connecting the output of the photomultiplier to each element with each element but one delivering its output to an individual meter; means joining the outputs of said meters and the output from said one element and feeding the combined output to an integration meter; shunts across a portion of the resistances of said photomultiplier, one shunt for each color filter; and a second means operative in synchronism with the movement of said movable body for controlling said shunts to change the gain of the photomultiplier in accordance with the color filter presented to the photomultiplier.

2. A colorimeter comprising a movable body carrying a number of color filters; a photomultiplier provided with dynodes connected by resistances and in a position to receive in sequence, light transmitted through the filters; a device comprising a multiplicity of energy translating elements, means operative in synchronism with the movement of the movable body for sequentially connecting the output of the photomultiplier to each element with each element but one delivering its output to an individual meter; means joining the outputs of said meters and the output from said one element and feeding the combined output to an integration meter; a multiplicity of shunts across a portion of the resistances of said photomultiplier, one shunt for each color filter; a second means operative in synchronism with the movement of said movable body for controlling said shunts to change the gain of the photomultiplier in accordance with the color filter presented to the photomultiplier; and additional means comprising an adjustable light transmitting medium between the movable body and the photomultiplier for varying the overall light response of the photomultiplier.

3. A colorimeter comprising a movable body carrying a number of color filters; a photomultiplier provided with dynodes connected by resistances and in a position to receive, in sequence, light transmitted through the filters; a device comprising a multiplicity of energy translating elements; means operative in synchronism with the movement of the movable body for sequentially connecting the output of the photomultiplier to each element with each element but one delivering its output to an individual meter; means joining the outputs of said meters and the output from said one element and feeding the combined output to an integration meter; a multiplicity of shunts across a portion of the resistances of the photomultiplier, one shunt for each color filter; a second means operative in synchronism with the movement of said movable body for controlling said shunts to change the gain of the photomultiplier in accordance with the color filter presented to the photomultiplier; and additional means comprising a potentiometer in series with the photomultiplier for varying the overall light response of the photomultiplier.

4. A colorimeter comprising a movable body carrying a number of color filters; a photomultiplier provided with dynodes connected by resistances and in a position to receive, in sequence, light transmitted through the filters; a device comprising a multiplicity of energy translating elements; means operative in synchronism with the movement of the movable body for sequentially connecting the output of the photomultiplier to each element with each element but one delivering its output to an individual meter; means joining the outputs of said meters and the output from said one element and feeding the combined output to an integration meter; shunts across a portion of the resistances of said photomultiplier, one shunt for each color filter; a second means operative in synchronism with the movement of said movable body for controlling said shunts to change the gain of the photomultiplier in accordance with the color filter presented to the photomultiplier; additional means comprising an adjustable light transmitting medium between the movable body and the photomultiplier; and a potentiometer in series with the photomultiplier for varying the overall light response of the photomultiplier.

5. A colorimeter comprising a rotatable tricolor wheel; a diaphragm having an adjustable opening and a photomultiplier cell having voltage dropping resistors connected between dynodes of the cell, the cell being in position to receive light passing through the opening in the diaphragm and wheel; means synchronized with the rotation of the wheel for feeding the output of the cell, in sequence, to the grids of three triodes each of which is comprised of an anode, a grid and a cathode; three potentiometers in parallel bridging at least one of the dropping resistors; a switch in series with each of the potentiometers; means, also synchronized with the rotation of the wheel, to operate the switches in sequence; a potentiometer in series with the photo-multiplier cell; a direct current supply having a positive pole connected to each of the triode anodes; two ammeters, one each in series with the cathodes of two of the triodes; a third ammeter; and connections leading from the cathode of the third triode and from the otherwise free ends of the first two ammeters to the third ammeter, said third ammeter being connected between said connecting means and the negative pole of said supply.

6. A colorimeter comprising a rotatable tricolor wheel; a diaphragm having an adjustable opening and a photomultiplier cell having voltage dropping resistors connected between dynodes of the cell, the cell being in position to receive light passing through the opening in the diaphragm and wheel; means synchronized with the rotation of the wheel for feeding the output of the cell, in sequence, to the grids of three triodes each of which is comprised of an anode, a grid and a cathode; three potentiometers in parallel bridging at least one of the dropping resistors; a switch in series with each of the potentiometers; means, also synchronized with the rotation of the wheel, to operate the switches in sequence; a potentiometer in series with the photo-multiplier cell; a direct current supply having a positive pole connected to each of the triode anodes; a limiting resistor and an ammeter in series therewith connected to the cathode of one of the triodes; a second resistor and second ammeter in series therewith connected to the cathode of the second of the triodes; a third limiting resistor connected to the cathode of the third triode; means connecting the otherwise free ends of the meters and the third resistor together; a third meter connected between said connecting means and the negative pole of said supply; and a cathode biasing supply having a negative pole connected via individual potentiometers to the juncture between limiting resistor and meter of each of the first two triodes and to the said connecting means with the positive end connected to the negative pole of the supply to the triodes.

7. A colorimeter comprising an iris diaphragm, a condensing lens, a rotatable color wheel and a photo-multiplier cell having voltage dropping resistors connected between dynodes of the cell, all in position for light passing through the diaphragm lens and wheel to impinge and on the cell, means synchronized with the rotation of the wheel for feeding the output of the cell, in sequence, to the grids of three triodes each of which is comprised of an anode, a grid and a cathode, three potentiometers in parallel bridging at least one of the dropping resistors, a switch in series with each of the potentiometers, means, also synchronized with the rotation of the wheel, to operate the switches in sequence, a potentiometer in series with the photo-multiplier cell, a direct current supply having a positive pole connected to each of the triode anodes, a limiting resistor and an ammeter in series therewith connected to the cathode of one of the triodes, a second series connected resistor and ammeter connected to the cathode of the second of the triodes, a third limiting resistor connected to the cathode of the third triode, means connecting the otherwise free ends of the meters and the third resistor together, a third meter connected between said connecting means and the negative pole of said supply, and a cathode biasing supply having a negative pole connected via individual potentiometers to the juncture between limiting resistor and meter of each of the first two triodes and to the said connecting means with the positive end connected to the negative pole of the supply to the triodes.

8. A colorimeter comprising a rotatable tricolor wheel; a diaphragm having an adjustable opening and a photomultiplier cell having voltage dropping resistors connected between dynodes of the cell, the cell being in position to receive light passing through the opening in the diaphragm and wheel; means synchronized with the rotation of the wheel for feeding the output of the cell, in sequence, to the grids of three triodes each of which is comprised of an anode, a grid and a cathode; a capacitor between each grid and its corresponding cathode; three potentiometers in parallel bridging at least one of the dropping resistors; a switch in series with each of the potentiometers; means, also synchronized with the rotation of the wheel, to operate the switches in sequence; a potentiometer in series with the photo-multiplier cell; a direct current supply having a positive pole connected to each of the triode anodes; a limiting resistor and an ammeter in series therewith connected to the cathode of one of the triodes; a second resistor and second ammeter in series therewith connected to the cathode of the second of the triodes; a third limiting resistor connected to the cathode of the third triode; means connecting the otherwise free ends of the meters and the third resistor together; a third meter connected between said connecting means and the negative pole of said supply; and a cathode biasing supply having a negative pole connected via individual potentiometers to the juncture between limiting resistor and meter of each of the first two triodes and to the said connecting means with the positive end connected to the negative pole of the supply to the triodes.

9. A colorimeter comprising a movable body carrying a number of color filters; a photomultiplier provided with dynodes connected by resistances in a position to receive in sequence, light transmitted through the filters; a device comprising a multiplicity of energy translating elements; means operative in synchronism with the movement of the movable body for sequentially connecting the output of the photomultiplier to each element with each element but one delivering its output to an individual meter; means joining the outputs of said meters and the output from said one element and feeding the combined output to an integration meter; shunts across a portion of the resistances of said photomultiplier, one shunt for each color filter; means acting on said shunts to switch them in and out of shunting relationship with the photomultiplier resistances, and means associated with the photomultiplier for varying the overall light response of the photomultiplier.

References Cited in the file of this patent

UNITED STATES PATENTS

| | | |
|---|---|---|
| 2,356,238 | Gillett et al. | Aug. 22, 1944 |
| 2,483,452 | Berkley | Oct. 4, 1949 |
| 2,548,118 | Morton et al. | Apr. 10, 1951 |
| 2,623,432 | Lange | Dec. 30, 1952 |

FOREIGN PATENTS

| | | |
|---|---|---|
| 412,096 | Great Britain | June 21, 1934 |
| 952,002 | France | Apr. 25, 1949 |

OTHER REFERENCES

"A Tristimulus Photometer," Sziklai, Journal of the Optical Society of America, volume 41; No. 5; May 1951, pages 321–23.